(12) United States Patent
Zaccardi et al.

(10) Patent No.: US 11,639,665 B2
(45) Date of Patent: May 2, 2023

(54) TURBOMACHINE COMPRISING A HEAT EXCHANGER IN THE SECONDARY PATH

(71) Applicant: SAFRAN AIRCRAFT ENGINES, Paris (FR)

(72) Inventors: Cédric Zaccardi, Moissy-Cramayel (FR); Christophe Marcel Lucien Perdrigeon, Moissy-Cramayel (FR); Catherine Pikovsky, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/430,228

(22) PCT Filed: Feb. 6, 2020

(86) PCT No.: PCT/FR2020/050207
§ 371 (c)(1),
(2) Date: Aug. 11, 2021

(87) PCT Pub. No.: WO2020/165527
PCT Pub. Date: Aug. 20, 2020

(65) Prior Publication Data
US 2022/0162952 A1 May 26, 2022

(30) Foreign Application Priority Data

Feb. 12, 2019 (FR) ...................................... 19 01392

(51) Int. Cl.
*F01D 9/04* (2006.01)
*F01D 5/18* (2006.01)
(Continued)

(52) U.S. Cl.
CPC .............. *F01D 9/041* (2013.01); *F01D 5/187* (2013.01); *F01D 9/065* (2013.01); *F02C 6/08* (2013.01);
(Continued)

(58) Field of Classification Search
CPC .......... F01D 9/065; F01D 25/12; F01D 5/187; F05D 2260/20; F05D 2260/213; F05D 2260/2214; F02C 7/185; F02C 6/08
See application file for complete search history.

(56) References Cited

U.S. PATENT DOCUMENTS

| | | | | |
|---|---|---|---|---|
| 4,720,239 A | * | 1/1988 | Owczarek | ............... F01D 5/141 |
| | | | | 415/181 |
| 2009/0317238 A1 | * | 12/2009 | Wood | ...................... F01D 5/147 |
| | | | | 415/177 |

(Continued)

FOREIGN PATENT DOCUMENTS

| | | | | |
|---|---|---|---|---|
| EP | 3 165 451 A1 | | 5/2017 | |
| GB | 828574 A | * | 2/1960 | ............. F01D 5/187 |

OTHER PUBLICATIONS

International Search Report dated May 6, 2020 in PCT/FR2020/050207 filed on Feb. 6, 2020, citing references AA-AD and AO therein, 2 pages.

(Continued)

*Primary Examiner* — Christopher Verdier
(74) *Attorney, Agent, or Firm* — Oblon, McClelland, Maier & Neustadt, L.L.P.

(57) ABSTRACT

A turbomachine blade including a body that extends mainly in a plane defined by a main axis and a longitudinal direction, which is defined by a lower surface wall, an upper surface wall, a leading edge located at a first longitudinal end of the body and a trailing edge located at a second longitudinal end of the body, wherein the body of the blade includes a plurality of first pipes that extend mainly along (Continued)

the direction of the main axis, for circulation of a gas flow, and a plurality of second pipes that extend mainly along the longitudinal direction, for circulation of a second gas flow.

8 Claims, 5 Drawing Sheets

(51) Int. Cl.
  *F01D 9/06* (2006.01)
  *F02C 7/18* (2006.01)
  *F02C 6/08* (2006.01)
  *B33Y 80/00* (2015.01)

(52) U.S. Cl.
  CPC ............... *F02C 7/185* (2013.01); *B33Y 80/00* (2014.12); *F05D 2240/121* (2013.01); *F05D 2250/61* (2013.01); *F05D 2250/712* (2013.01); *F05D 2260/213* (2013.01); *F05D 2260/2214* (2013.01); *F05D 2260/232* (2013.01); *F05D 2260/606* (2013.01)

(56) References Cited

U.S. PATENT DOCUMENTS

| | | | |
|---|---|---|---|
| 2012/0159961 A1* | 6/2012 | Krautheim | F02C 7/141 60/39.511 |
| 2015/0023776 A1* | 1/2015 | Ribarov | F01D 9/065 415/1 |
| 2015/0285186 A1* | 10/2015 | Roberge | F02C 7/06 60/39.83 |
| 2016/0237905 A1* | 8/2016 | Suciu | F02C 7/185 |
| 2017/0002685 A1 | 1/2017 | Todorovic | |
| 2017/0122207 A1 | 5/2017 | Suciu et al. | |
| 2017/0361418 A1* | 12/2017 | Twelves | B22F 10/70 |
| 2018/0187602 A1 | 7/2018 | Snape et al. | |
| 2019/0003315 A1 | 1/2019 | Erno et al. | |

OTHER PUBLICATIONS

Preliminary French Search Report dated Nov. 12, 2019 in French Patent Application No. 19 01392 filed on Feb. 12, 2019 (with translation of category of cited documents), citing references AA, AC, AD, and AO therein, 2 pages.

\* cited by examiner

TURBOMACHINE COMPRISING A HEAT EXCHANGER IN THE SECONDARY PATH

TECHNICAL FIELD

The invention relates to a turbomachine vane configured to enable cooling of an air flow under pressure intended to cool at least one component of the turbomachine or intended for the pressurisation of chambers containing a lubricant.

The invention relates more particularly to a turbomachine vane forming a heat exchanger between the pressurised air flow and an air flow circulating in a bypass flow stream of the turbomachine.

STATE OF PRIOR ART

In existing turbomachines, there are many air circuits internal to the engine. These circuits perform different functions.

Among these circuits, one air circuit performs the lubrication oil chambers' pressurisation function to prevent oil from escaping from these chambers, and also the low pressure shaft cooling function.

Air from this circuit is drawn off from the core flow stream, downstream from the low pressure compressor, preferably between the low pressure compressor and the high pressure compressor.

This air is then evacuated through the deoilers as regards air passing through the chambers, and downstream from the low pressure turbine for other air.

This circuit will be affected by head losses due to changes in radii, holes, seals, etc. Therefore the pressure ratio (drawn off pressure/outlet pressure) must be large enough for air to circulate satisfactorily with the required flow rate.

One of the constraints on this air circuit is that the air temperature must be low enough to cool the low pressure shaft and to avoid excessively heating oil in the chambers. The air pressure must be sufficient so that the pressure mentioned above is high enough and enables the specified flow to circulate.

Also in some turbomachines, the thermodynamic cycle is such that the pressure ratio is too low for this circuit to perform these functions. Therefore, an alternative solution must be found.

Document EP 743,435 describes a turbomachine comprising a heat exchanger integrated into vane of a stator vane assembly located in the bypass flow stream.

According to this document, the vane comprises a through cavity at each radial end of the vane for the inlet or outlet of the air flow to be cooled.

The cooling efficiency of the air flow to be cooled is limited because heat exchange surface areas are limited.

The purpose of the invention is to disclose a turbomachine vane and a turbomachine to optimise the heat exchange.

PRESENTATION OF THE INVENTION

The invention relates to a turbomachine vane comprising a body extending principally in a plane defined by a principal axis B and a longitudinal direction, that is delimited by an intrados wall, an extrados wall, a leading edge at a first longitudinal end of the body and a trailing edge located at a second longitudinal end of the body, characterised in that the body of the vane contains a plurality of first ducts carrying the circulation of a gas flow that extends principally along the direction of the principal axis B and a plurality of second ducts carrying the circulation of a second gas flow that extends principally along the longitudinal direction.

The integration of two sets of ducts into the body of the vane increases the heat exchange surface areas between the two air flows, thus improving cooling of the second gas flow.

Preferably, each first duct comprises two ends that are open at the same end of the body along the principal axis B.

Preferably, the set of ends of the first ducts forms a bundle that progressively narrows as the distance from said at least one end of the body decreases.

Preferably, each second duct comprises two ends that open up in either the intrados wall or the extrados wall of the body.

Preferably, each second duct comprises two ends that open up at the leading edge or at the trailing edge.

Preferably, each second duct has a corrugation in a transverse direction perpendicular to a vertical longitudinal plane and each first duct is located in a concave segment of the second duct.

Preferably, the first ducts are arranged transversely on each side of each second duct.

Preferably, the vane is manufactured using an additive technology process.

The invention also relates to an aircraft turbomachine comprising a core air flow stream passing through a low pressure compressor and a high pressure compressor, a bypass air flow stream that is located around and coaxial with the core flow stream, comprising a stator vane assembly for the air flow through the bypass flow stream, comprising a plurality of vanes distributed around a principal axis A of the turbomachine, a pressurised air circuit that draws off air between the low pressure compressor and the high pressure compressor or in the high pressure compressor, to produce a pressurised air flow that supplies at least one component of the turbomachine, characterised in that the plurality of vanes comprises at least one vane according to the invention, the principal axis of which is oriented primarily radially from a principal axis A of the turbomachine and the longitudinal direction is substantially parallel to said principal axis A, comprising first ducts and second ducts and in that the pressurized air flow passes through the first ducts of said at least one vane and part of the air flow flowing in the bypass flow stream passes through the second ducts of said at least one vane.

Preferably, the principal axis of said at least one vane is oriented principally radially from a principal axis A of the turbomachine and the longitudinal direction of said at least one vane and the second ducts of said at least one vane are substantially parallel to the principal axis A corresponding to the direction of the air flow in the bypass flow stream.

BRIEF DESCRIPTION OF THE DRAWINGS

Other characteristics and advantages of the invention will become clear after reading the following detailed description, that will be better understood by referring to the appended figures among which.

DETAILED PRESENTATION OF PARTICULAR EMBODIMENTS

The vertical, longitudinal and transverse orientations according to the V, L, T coordinate system shown on the figures will be adopted for the description of the invention.

Figure 1:
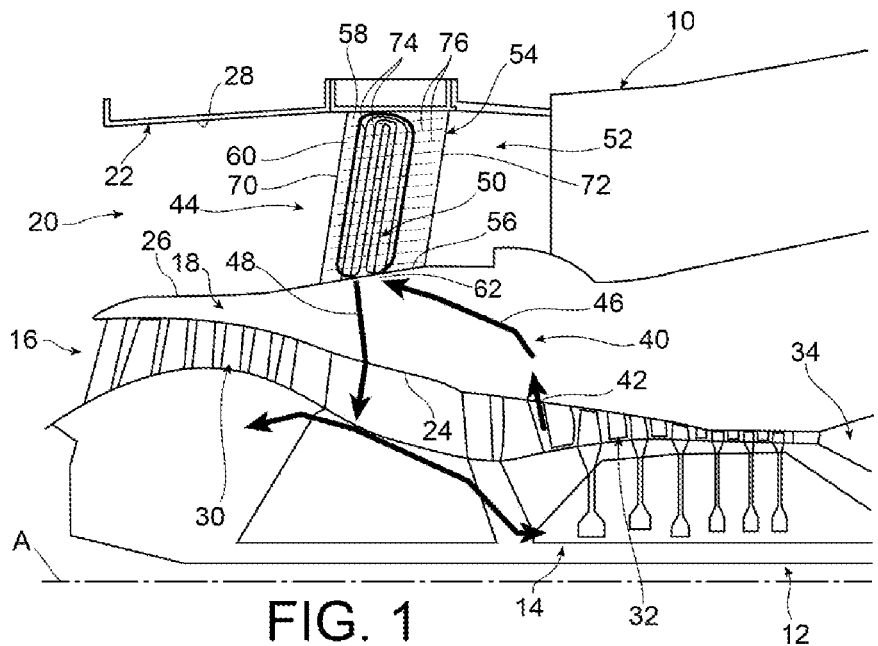
FIG. 1 is a diagrammatic axial sectional representation of an aircraft turbomachine comprising a pressurised air circuit made according to the invention.

FIG. 1 shows an aircraft turbomachine 10 comprising a principal axis A.

The turbomachine 10 comprises, in order of distance from its principal axis A, a low pressure shaft 12, a high pressure shaft 14, a core air flow stream 16, a bypass air flow stream 20, a core compartment 18 separating the core flow stream 16 and the bypass flow stream 20 and an intermediate case shell 22.

The core compartment 18, also called the "inter-flow stream compartment", is radially delimited from the principal axis A by a radially internal wall 24 delimiting the exterior of the core flow stream 16 and a radially external wall 26 delimiting the interior of the bypass flow stream 20. The shell 22 comprises a radially internal wall 28 delimiting the exterior of the bypass flow stream 20.

The core flow 16 comprises, in order from upstream to downstream along the air flow direction and along the principal axis, in other words from left to right with reference to FIG. 1, a low pressure compressor 30, a high pressure compressor 32, a combustion chamber 34, a high pressure turbine and a low pressure turbine (not represented).

The bypass flow stream 20 comprises a vane assembly 52 that is intended to redirect the air flow in the bypass flow stream 20 so that its flow is oriented substantially along the axial direction in other words substantially parallel to the principal axis A.

To achieve this, the vane assembly 52 comprises a plurality of vanes 54 distributed uniformly around the principal axis A of the turbomachine 10 that act on the air flow circulating in the bypass flow stream 20.

Each vane 54 extends principally in a plane defined by a principal axis B and a longitudinal direction. When the vane 54 is mounted in the vane assembly 52, the principal axis B is oriented substantially radially from the principal axis A, in other words it is significantly inclined from the radial orientation and the longitudinal direction is parallel to the principal axis A.

Each vane 54 has a first end called the root 56 along the principal axis B for its connection with the core compartment 18 and a second end called the tip 58 along the principal axis B, for its connection with the shell 22. The first end 56 is radially internal and the second end is radially external to the principal axis A when the vane 54 is mounted in the vane assembly 52.

The turbomachine 10 also comprises a pressurised air circuit 40 designed to firstly cool the low pressure shaft 12 and secondly supply pressurised air to the chambers containing lubrication oil for mobile parts, that are located at the low pressure shaft and that pressurise these chambers.

This pressurised air can also be directed to a speed reducer (not represented) located between the low pressure shaft 12 and the turbomachine fan to ventilate or cool the turbomachine.

The speed reducer will dissociate the rotation speed of the fan from the rotation speed of the low pressure shaft 12 that drives the fan.

In particular, this reduces the rotation speed of the vanes of the fan relative to the rotation speed of the vanes of the low pressure compressors, and thus optimises the efficiency of each and therefore improves the propulsion efficiency. Such a reducer is particularly advantageous in the case of a turbojet with a high dilution ratio, in other words for which the ratio between the quantity of air flowing in the bypass flow stream and the quantity of air flowing in the core flow stream, is high.

This pressurised air circuit 40 comprises at least one air drawing off point 42 located on the radially internal wall 24 of the core compartment 18. This drawing off point 42 is located between the low pressure compressor 30 and the high pressure compressor 32, or in the high pressure compressor 32, as shown in FIG. 1.

In the latter case, the drawing off point is located at one of the stages of the high pressure compressor 32 that is determined as a function of the pressure of the pressurised air, its temperature and the possibility of drawing off on the first stages of the high pressure compressors 32 despite the presence of variable stator vanes (VSV).

The pressure of the drawn off air is sufficiently high to pressurise the oil chambers. However, the temperature of this air is too high to cool the low pressure shaft 12 and also to have good operating conditions for the lubrication circuit.

The pressurised air circuit 40 comprises a heat exchanger 44 for this purpose that reduces the temperature of the pressurised air.

This heat exchanger 44 is of the air-air type and the cold air source consists of air circulating in the bypass flow stream 20.

In this case, the heat exchanger 44 is formed in at least one vane 54 of the vane assembly 52, through which the pressurised air circulates, to exchange heat with air circulating in the bypass flow stream 20.

The pressurised air circuit 40 comprises, in the direction of the air flow in the circuit, an upstream segment 46 that extends from the air drawing off point 42 as far the vane 54, the vane 54, a downstream segment 48 that extends from the vane 54 to the low pressure shaft 12 and means (not represented) of distributing pressurised air towards cooling points of the low pressure shaft 12 and oil pressurisation chambers.

Thus, the upstream segment 46 of the pressurised air circuit 40 extends through the core compartment 18, from its radially internal wall 24 at which the upstream segment 46 is connected to the air drawing off point 42, as far as the radially external wall 26 of the core compartment 18, at which it is connected to the vane 54.

The downstream segment 48 of the pressurised air circuit extends through the core compartment 18, starting from its radially external wall at which it is connected to the vane 54 and it also passes through the core flow stream 16 in profiled arms (not shown) advantageously positioned between the low pressure compressor 30 and the high pressure compressor 32.

Figure 2:
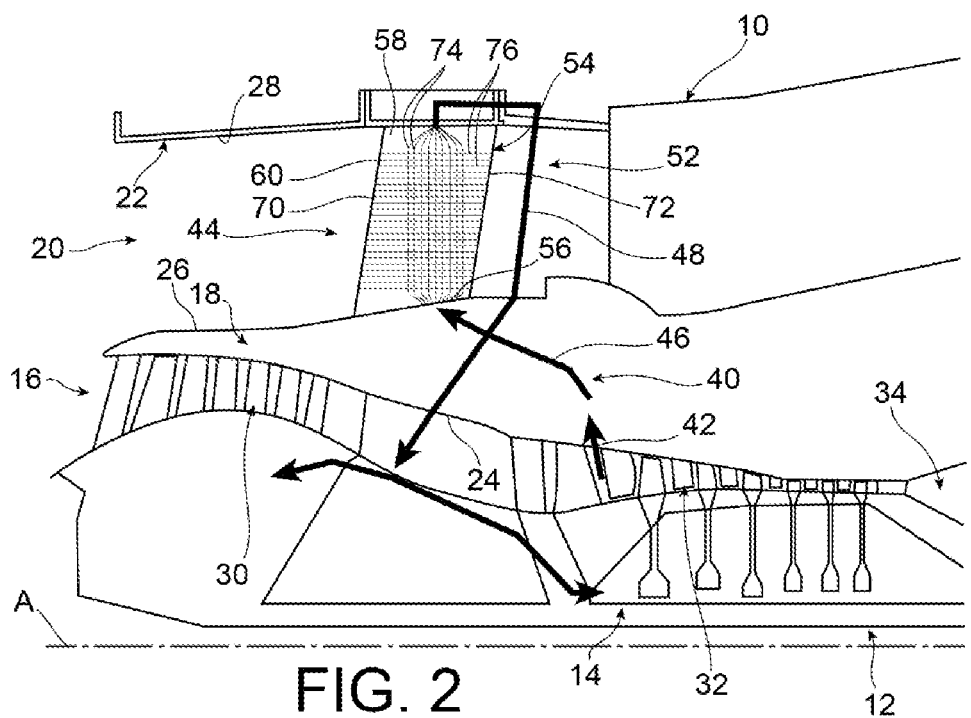
FIG. 2 is a view similar to that in FIG. 1, showing a variant embodiment of the pressurised air circuit.

In a second embodiment shown in FIG. 2, the downstream segment 48 of the pressurised air circuit 40 is connected to the outer radial end 58 of the vane 54, it passes through the secondary flow stream 20 and the core compartment 18, for example passing through section arms (not shown) then it also passes through the core flow stream 16 in section arms (not shown) advantageously placed between the low pressure compressor 30 and the high pressure compressor 32.

As mentioned above, the cold air source of the vane 54 is composed of air circulating in the bypass flow stream 20.

Therefore heat exchanges take place through the constituent material of the vane 54. The vane 54 is composed of a body 60 with a vertical principal orientation, a lower end 56 called the root and a upper end 58 called the tip.

The body 60 is transversely delimited by an intrados wall 66 and an extrados wall 68. The two walls (intrados 66 and extrados 68) are connected to a first longitudinal end of the body at a leading edge 70, that is an upstream edge of the body along the direction of air flow in the bypass flow stream 20, and they connect to a second longitudinal end of the body at a trailing edge 72, that is a downstream edge of the body 60 along the direction of air flow in the secondary flow stream 20.

As mentioned above, the compressed air flow circulates through the vane 54. To achieve this, the body 60 comprises a plurality of ducts 74 that are oriented in the body 60 along the direction defined by the principal axis B of the vane 54.

According to the embodiment shown in FIG. 1, the ducts 74 open up only at the root 56 of the vane 54. They then have a curved U shape at tip 58 of the vane 54, in other words comprising two branches substantially parallel to the principal axis B and a curved segment connecting these two branches, that is located at the tip 58 of the vane 54.

According to the embodiment shown in FIG. 2, the ducts 74 open up at their ends at the root 56 and at the tip 58 of the vane 54. To achieve this, the root and the tip of the vane 54 comprise connection means (not shown) at the upstream segment 46 and the downstream segment 48. Also, to facilitate the connection of the first ducts 74, all ends of the first ducts 74 are inclined relative to each other and relative to the principal orientation of the axis B to form a bundle that progressively becomes tighter as the distance from the tip 58 or the root 56 of the vane 54 reduces.

In the following description, reference will be made to the embodiment according to which the ducts 74 open up radially at each end 56, 58 of the vane 54, as shown in FIG. 2. It will be understood that the invention is not limited to this embodiment and that it also applies to U-shaped curved ducts, as shown in FIG. 1.

As can be seen particularly in FIG. 2, the ducts 74 are oriented principally along the direction of the principal axis B and are offset longitudinally to be distributed longitudinally over the entire length of the body 60.

The large number of these ducts 74 makes it possible to have a large heat exchange surface area between the body 60 of the vane 54 and the pressurised air flow and to make maximum use of the surface area and the volume of the vane.

The air flow circulating through the bypass stream 20 is in contact with the intrados wall 66 and the extrados wall 68 to exchange heat with the body 60 of the vane 54.

To further increase the heat exchange surface area between the body 60 of the vane 54 and the air flow circulating in the bypass flow stream 20, the body 60 of the vane 54 comprises a plurality of other ducts 76 with principally longitudinal orientation designed to carry circulation of part of the air flow circulating in the bypass flow stream 20.

In the following description, the ducts 74 through which the pressurized air flow stream passes will be designated as "first ducts" and the ducts 76 through which the fresh air flow stream circulating in the bypass flow stream 20 circulates will be designated as "second ducts".

The second ducts 76 are oriented along the principal longitudinal direction and are distributed in the body 60 along the direction of principal axis B.

The combination of the first ducts 74 and the second ducts 76 forms a mesh in the body 60 of the vane 54, thus facilitating heat exchanges between the two air flow streams.

Figure 3A:
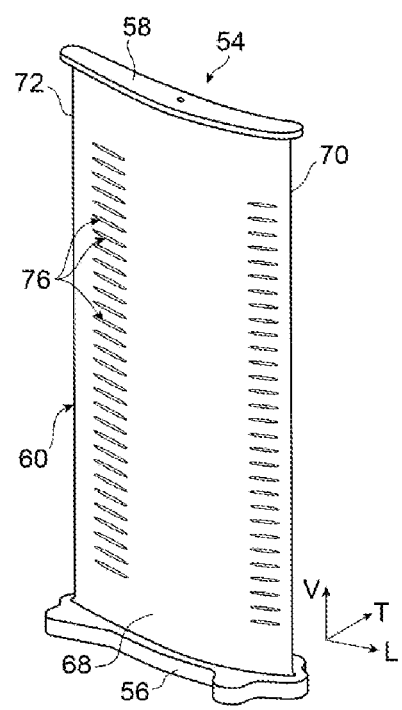
FIG. 3A is a perspective diagrammatic representation of a vane according to the invention.
Figure 3B:
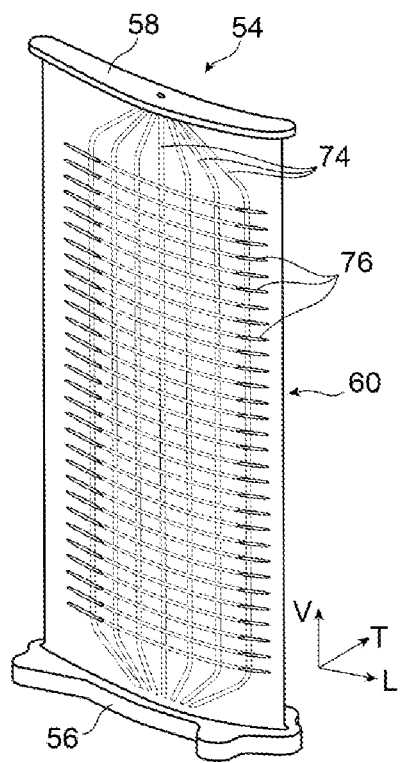
FIG. 3B is a perspective diagrammatic cutaway representation of the vane shown in FIG. 3A, showing the first and second ducts.
Figure 4:
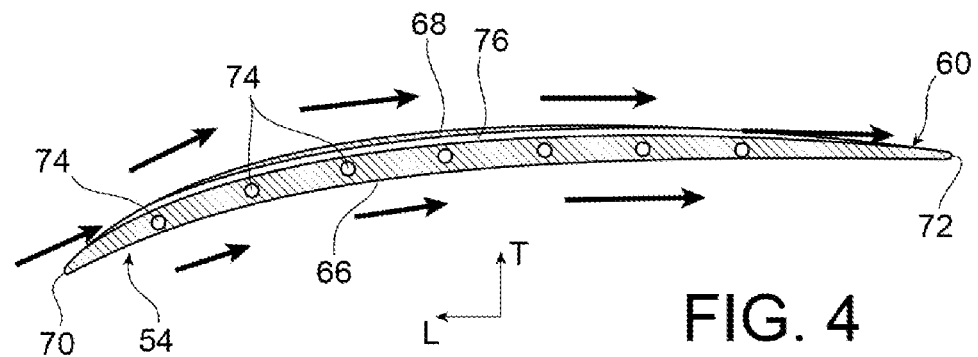
FIG. 4 is a section through the vane shown in FIG. 3A along a longitudinal plane.

According to a first embodiment represented in FIGS. 3A to 4, the second ducts 76 are formed between the extrados wall 68 and the first ducts 74.

In addition, both ends of each second duct 76 open up in the extrados wall 68.

This configuration makes it possible to draw off some of the air flowing along the extrados wall 68 and to discharge hot air along the same flow direction, along the extrados wall 68 while producing low aerodynamic disturbances.

Therefore, this relative position of the second ducts 76 relative to the extrados wall 68 and relative to the first ducts 74 makes it possible to place the first ducts 74 at a distance from the extrados wall 68, which is a wall of the vane 54 most exposed to external aggression, for example such as hail.

It will be understood that the invention is not limited to this embodiment and that the second ducts 76 may be formed between the intrados wall 66 and the first ducts 74 and that their two ends may open up in the intrados wall 66.

Figure 5A:
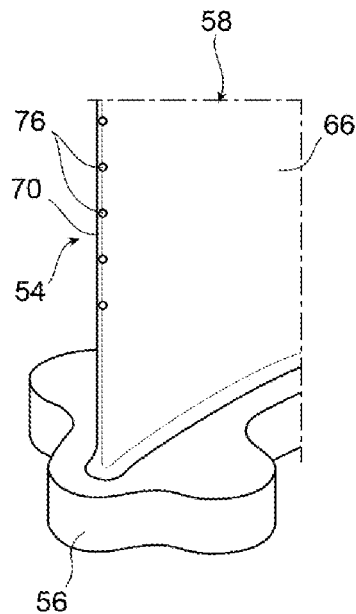
FIG. 5A is a detailed perspective view of a vane made according to a second embodiment of the invention.
Figure 5B:
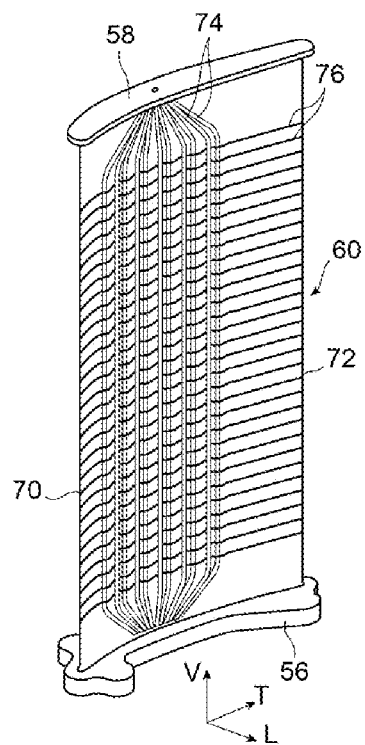
FIG. 5B is a perspective diagrammatic cutaway representation of the vane shown in FIG. 5A, showing the first and second ducts.
Figure 6:
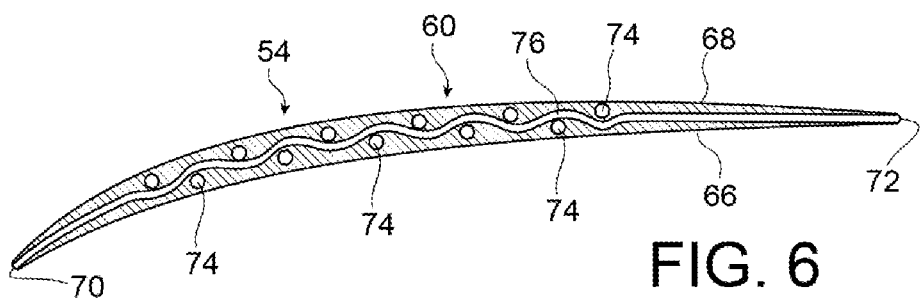
FIG. 6 is a section through the vane shown in FIG. 5B along a longitudinal plane.

In a second embodiment shown in FIGS. 5A to 6, the second ducts 76 pass longitudinally over the entire body 60 of the vane 54, from the leading edge 70 to the trailing edge 72.

This embodiment can limit the generation of disturbances on the intrados wall 66 or on the extrados wall 68. Drawing off part of the air flow circulating in the bypass flow stream 20 minimises disturbance of the air flow through the secondary flow stream 20. Air flowing through these second ducts 76 is also straightened and emerges along the longitudinal direction According to a first embodiment of another aspect of the invention, relating to the relative arrangement of the different ducts 74, 76, the second ducts 76 are arranged transversely between the first ducts 74 and the extrados wall 68 to promote heat exchanges, as shown in detail in FIG. 4.

According to a second embodiment of this other aspect of the invention and as represented in detail in FIG. 6, each second duct 76 has corrugations in its principal longitudinal transverse plane.

These corrugations make it possible for the second duct 76 to pass between the first ducts.

Thus, each first duct is associated with a curved segment of each second duct 76 and is located inside the concave portion of the curved segment.

This enables better distribution of heat exchanges in the vane 54 and also a greater number of first ducts 74 in the same body 60, for the same distance between two adjacent first ducts 74.

The material from which the vane 54 is made is thus chosen to have good thermal conduction properties. This material is also chosen as a function of the mechanical properties of the vane 54, especially when the vane 54 performs a structural role providing a mechanical connection between the shell 22 of the intermediate case and the core compartment 18.

Also, the material from which the vane 54 is made is chosen to facilitate its manufacturing. Preferably, the vane 54 is manufactured by additive technology because this technology can be used to make the different ducts 74, 76 in the vane 54. Thus, the material from which the vane 54 is made must be suitable for use of this manufacturing method.

Other methods of making the vane 54 may be considered, such as moulding and/or machining.

Aluminium is cited as a non-limitative example of a material with good thermal conduction properties.

The invention claimed is:

1. A turbomachine vane comprising:
   a body extending principally in a plane defined by a principal axis and a longitudinal direction, the body being delimited by an intrados wall, an extrados wall, a leading edge located at a first longitudinal end of the body and a trailing edge located at a second longitudinal end of the body,
   wherein the body of the vane contains a plurality of first ducts through which flows a first gas flow that extend principally along the direction of the principal axis, and a plurality of second ducts through which flows a second gas flow that extend principally along the longitudinal direction,
   wherein each second duct has a corrugation in a transverse direction perpendicular to a vertical longitudinal plane and each first duct is located adjacent a concave segment of the second duct.

2. The vane according to claim 1, wherein each first duct comprises two ends that are open at at least one end of the body along the principal axis.

3. The vane according to claim 2, wherein a set of the ends of the first ducts forms a bundle that progressively narrows as the distance from said at least one end of the body decreases.

4. The vane according to claim 1, wherein each second duct comprises two ends that open up at the leading edge or at the trailing edge.

5. The vane according to claim 1, wherein the first ducts are arranged transversely on each side of each second duct.

6. The vane according to claim 1, wherein the vane is manufactured using an additive technology process.

7. An aircraft turbomachine comprising:
   a core air flow stream passing through a low pressure compressor and a high pressure compressor,
   a bypass air flow stream that is located around and coaxial with the core flow stream, comprising a stator vane assembly for the air flow through the bypass flow stream, comprising a plurality of vanes distributed around a principal axis of the turbomachine,
   a pressurized air circuit that draws off air between the low pressure compressor and the high pressure compressor or in the high pressure compressor, to produce a pressurized air flow,
   wherein the plurality of vanes comprises at least one vane according to claim 1, the principal axis of which is oriented primarily radially from the principal axis of the turbomachine and the longitudinal direction is parallel to said principal axis of the turbomachine, wherein the pressurized air flow passes through the first ducts of said at least one vane and part of the air flow flowing in the bypass flow stream passes through the second ducts of said at least one vane.

8. The turbomachine according to claim 7, wherein the principal axis of said at least one vane is oriented principally radially from the principal axis of the turbomachine and the longitudinal direction of said at least one vane and the second ducts of said at least one vane are parallel to the principal axis of the turbomachine corresponding to a direction of the air flow in the bypass flow stream.

* * * * *